Dec. 15, 1942.  H. E. KOEPCKE  2,305,089
VALUE CONTROL
Filed July 1, 1939  3 Sheets-Sheet 1

INVENTOR:
HARRY E. KOEPCKE
BY Bruno Fechler
ATTORNEYS.

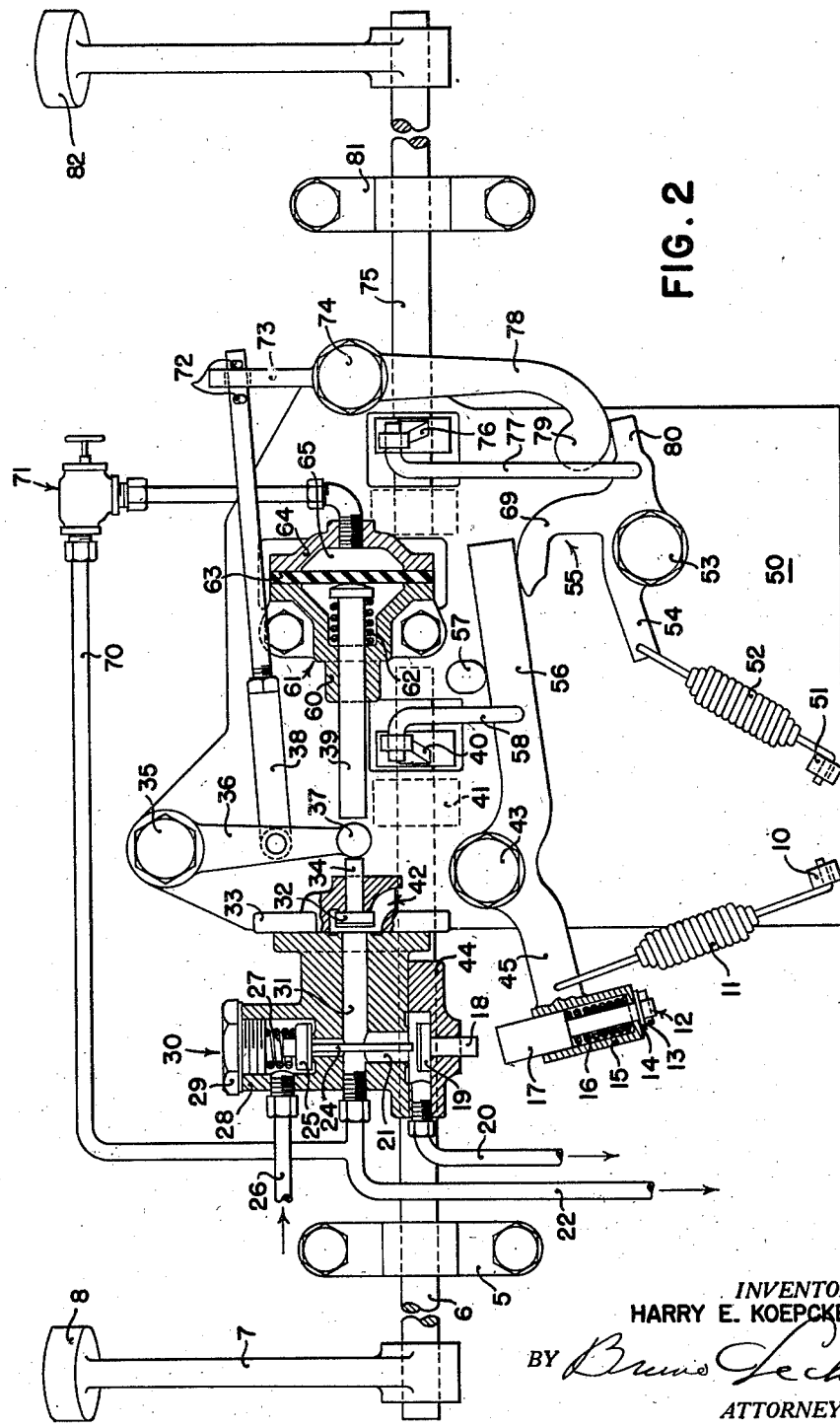

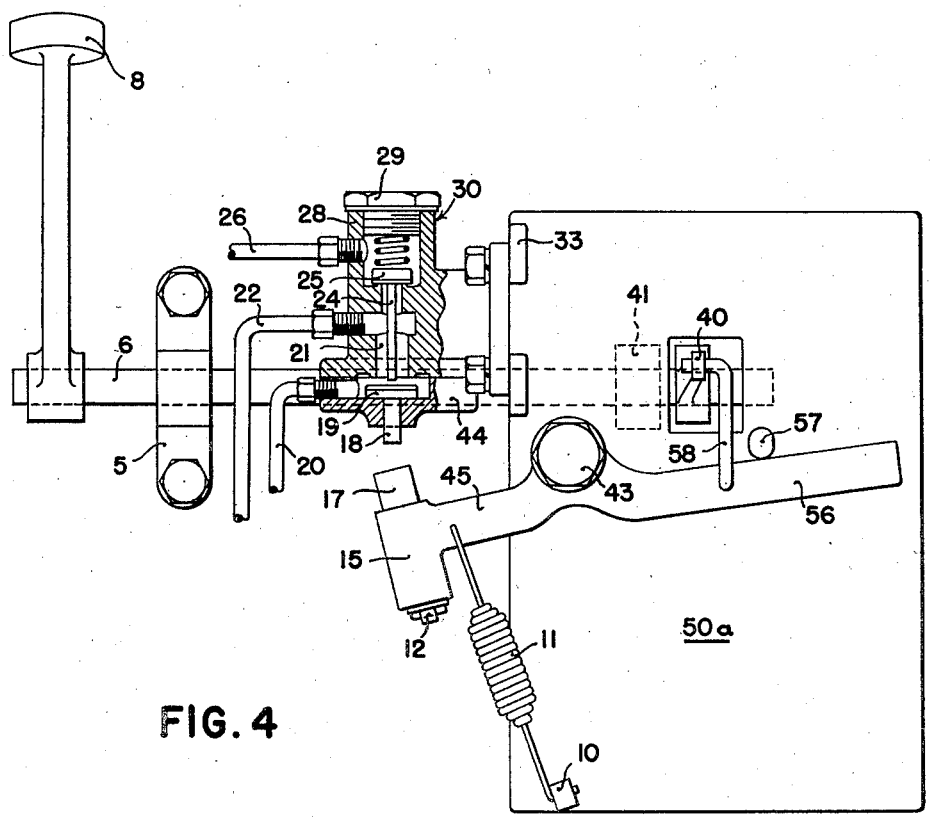

Patented Dec. 15, 1942

2,305,089

UNITED STATES PATENT OFFICE 2,305,089

VALVE CONTROL

Harry E. Koepcke, East Moline, Ill., assignor to American Machine and Metals, Inc., New York, N. Y., a corporation of Delaware Application July 1, 1939, Serial No. 282,378

9 Claims. (Cl. 192—131)

The object of this invention is to provide an improved control for a fluid valve of the type herein described.

A further object is to provide an improved control of a three-way valve that connects a machine alternately to a pressure line and an exhaust line.

A further object is to provide an improved control for such a three-way valve controlling a machine or in which one hand actuates the valve while the other hand actuates a bolt that tends to lock the valve in whatever position it chances to be.

A further object of the invention is to provide a valve for the control of a machine or the like which may be latched in its open position after the operation controlled by the valve has definitely gotten under way but not before the lapse of a small time interval sufficient to permit the operation to have gotten under way.

A further object of the invention is to provide a valve having automatic means tending to close the valve, means for latching the valve open, and automatic means effective upon the failure of the power supply, releasing the automatic means to close the valve.

A further object of the invention is to provide a simple manual control for a three-way valve biased toward one position to which can be added locking elements if desired and finally time lag and pressure failure elements when the valve uses demand them.

This valve may be employed to control the flow of fluid to any branch line in a pressure system. It is particularly well suited for the control of fluid supplied to such branch lines where upon the completion of the operation the fluid supply is to be cut off and the fluid already supplied permitted to escape from the branch line through an exhaust or the like. The valve may be operated by one hand alone. This hand is free to vary the speed of operation, to throw the valve on or off with entire freedom as long as the safety latch controlled by the second hand is withdrawn. When the hand is released from the safety latch the safety latch will automatically hold the valve either in its operated or in its initial position, depending upon its position at the time the latch is released, and will prevent thereafter the further operation of the valve either by jarring, or accidental contact until the safety latch is manually released.

It has been found desirable in many operations controlled by a valve that the operator shall stand by the valve until the operation which it controls has gotten under way satisfactorily. Thus, depending upon the type of application, there may be an obstruction to the operation of the machine, a lack of material to be operated on, or there may be initial unsteadiness of operation in passing through critical speeds or any one of a number of variable factors that precede the smooth operation of the unit.

Once in satisfactory operation the valve may safely be latched down so that the operator may proceed about his other duties. In the preferred form of the invention, although the operator has complete control of supplying fluid or shutting off its supply, and latching the valve shut at any time, auxiliary means are provided which will permit a diversion of the fluid unless the latching has been delayed long enough to assure that the operation can safely be left without the attention of the operator.

The means which permit latching the valve in the open position at the end of a short interval if the operator holds both hands down is controlled by the fluid flowing through the valve itself. Accordingly, even though the valve be latched shut, should the supply of fluid fail and the proper operation of the equipment controlled by the valve thereby be endangered, this fluid-controlled device will allow the valve to go back to its initial position.

This valve control is not limited to any particular application but may be used in a large variety of ways. While the control of a machine embodying a servo type motor consisting of an air-operated ram has been chosen to illustrate the invention, it is not limited to this illustrative example of its use. Further, it is not limited to the control of air, the particular fluid selected for illustration.

Figure 2 is a vertical section of the same device.

Figure 4 is an elevation of a simplified form of the device.

Figures 1, 3:
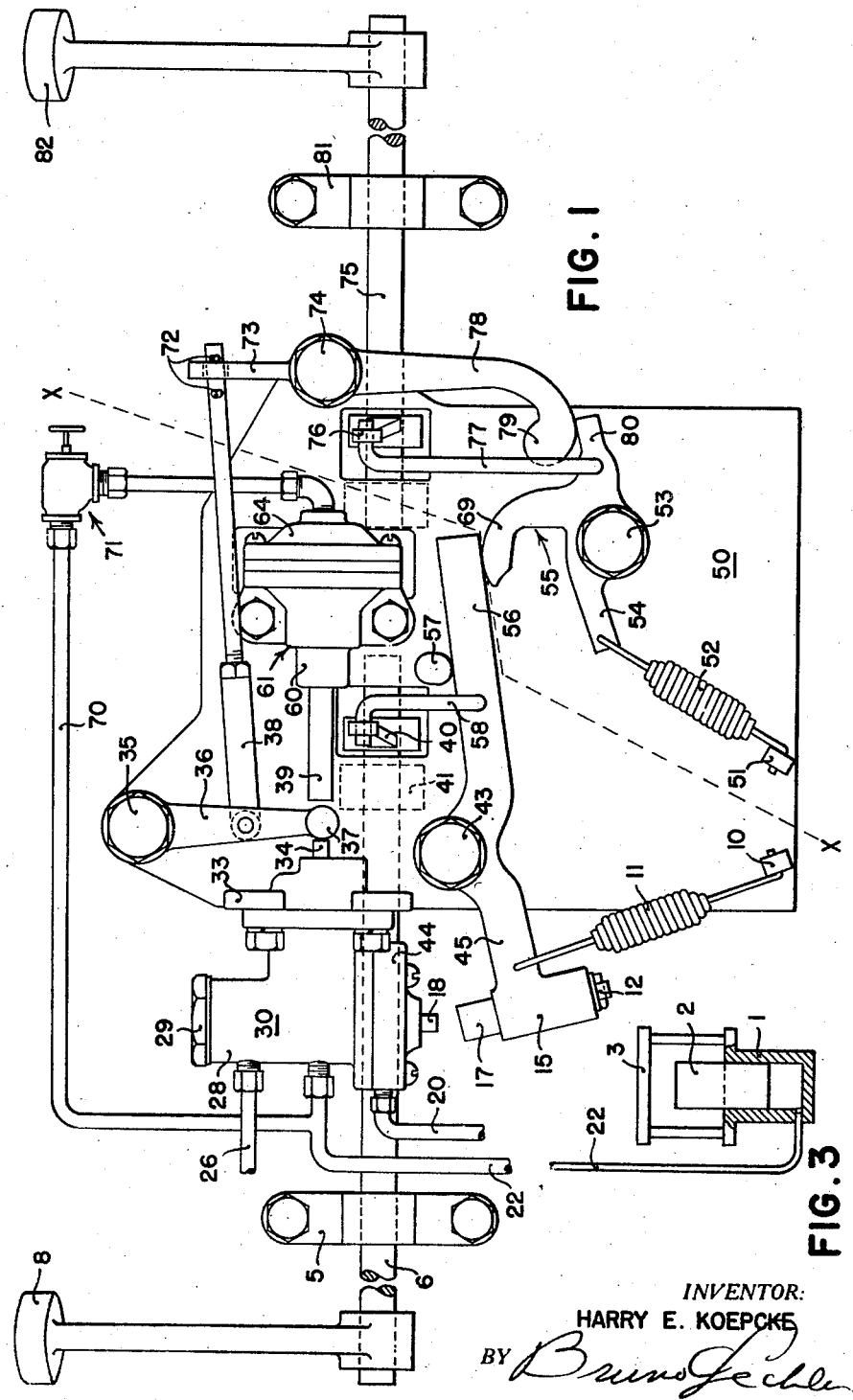
Figure 1 is an elevation of the device.
Figure 3 is a machine drawn to a smaller scale, controlled by the valve.

Fluid is supplied from line 26 to apparatus 2 connected to line 22. The fluid must pass through a valve generally indicated at 30. Valve 39 is controlled by a manual 8. A manual 82 may be provided to lock the mechanism controlling the valve in either its operative or inoperative position if it is desired to release the operator after the press is closed. However, the apparatus will function without the parts controlled by manual 82.

The valve is actuated when the manual 8 is depressed. Manual 8 is carried by lever 7 attached to a shaft 6 supported in bearings 5 and 41. To this shaft an arm 40 is also attached. A connecting link 58 connects the end of arm 40 with a lever 56 pivoted on stud 43. Thus, by depressing the manual 8 the shaft 6 is turned in bearings 5 and 41, carrying with it the crank arm 40 which in turn pushes the connecting link 58 downward and rotates the arm 56 about the stud 43.

As the arm 56 rotates about stud 43 a spring finger 17 contacts the valve button 18. This switches the connection 22 to the machine 2 from the exhaust 20 to the feed line 26. The spring finger 17 has a shank 12 that extends through the hollow end 15 of lever 56. The spring finger 17 is pushed forward and outward by a pre-loaded spring 16 and is restrained by a pin 13 passing through shank 12. Pin 13 presses upon a washer 14. The spring 16 is pre-loaded in such a manner that to further compress spring 16 will require a larger pressure than is necessary to actuate the valve button 18. If the lever 56 has greater movement than necessary to seat valve disk 19, that movement is taken up by the pre-compressed spring 16, preventing injury to the valve seats. A tension spring 11 is anchored at one end 10 to the base casting 50, and at the other end 45 to the lever 56.

Spring 11 tends to rotate the lever 56 about stud 43 in a counter-clockwise direction until it bears against stop 57. In so doing it pushes link 58 and the crank arm 40 back, rotating the shaft 6 and bringing the manual 8 to its elevated position. When the manual 8 is depressed the valve button 18 is actuated and when the manual 8 is released the spring 11 will restore the manual 8 to its initial position while a spring 27 inside the valve will restore valve button 18 to its initial position.

Valve 30 consists of a body 28 which may be bolted to a lug 33 on the casting 50. Into this valve body 28 leads an air line 26, and under certain conditions the air may flow out through passages 22, or 20. The valve body also supports valve cap 44 in which valve button 18 moves. Valve button 18 carries a disk 19 adapted to close off the flow of air from line 26 through space 21 into exhaust line 20. The upper end of valve body 28 is closed by a plug 29 and contains a spring 27 which presses downward upon valve disk 25, thus normally preventing the flow of air from inlet 26 through space 21 to any of the other outlets. The valve disk 25 also carries a stem 24 extending downward through the space 21 almost into contact with valve disk 19.

It will be evident that when the valve is in its unactuated position air from line 26 will fill the upper part of the valve body 28 but will be prevented from passing beyond the valve both by the pressure of air upon the valve disk 25 and by the pressure of valve spring 27. When by depressing manual 8 in the manner before described the spring finger 17 lifts valve button 18, the valve disk 19 will cut off the connection of line 22 through space 21 with the exhaust pipe 20 and by lifting the valve stem 24 will permit air to flow through space 21 into passages 22.

When the finger is released the valve automatically closes.

While reference has been had to several views to show the internal construction of the apparatus, all the parts constituting the simplest form of the apparatus are shown in Figure 4.

If the valve control is to be arranged so that, after the apparatus is functioning smoothly the operator may lock the device, manual 82 and other parts to the right of line XX in Figure 1, but excluding lever 78, may be added to the simplest form of the valve control shown in Figure 4.

To accomplish the locking of the valve in either of its two positions, the position where it connects the machine 2 to exhaust or where it connects it to an air supply, only latch rocker 55 and its connections need be added to the equipment described.

To latch the valve in the open position permitting the release of the hand from the manual 8 a latch rocker 55 is pivoted on stud 53 which is attached to casting 50. A tension spring 52, one end of which is attached at 51 to the casting 50 is attached at the other to arm 54 of the latch rocker 55. This spring tends to draw the hooked arm 69 into a position that will either hold the lever 56 in its off position shown where the lever is above the hooked arm 69, or in its actuated position when the lever 56 is below the hooked arm.

Moving with rocker 55 is a link 77 which is connected to crank arm 76 and to the extension 80 of rocker 55. Thus spring 52 will draw the crank arm 76 attached to a shaft, 75, which is journaled in bearing 81, and the manual 82 attached to the shaft into the position shown. In other words, manual 82 may be depressed from the position shown, but as soon as it is released spring 52 will restore all the parts that have been actuated by the manual 82 to the original position shown.

It will be seen that a latch has now been provided which is operated by one hand, the right hand in this case, and that this latch must be withdrawn to allow the left hand to shift the valve. If the latch hand is released before the valve hand releases, the latch will prevent the spring or other automatic means from moving the valve back to its initial position.

If the right hand now withdraws the bolt, spring 11, which is attached to arm 45 of lever 56, will draw the latter against stop 57. As this lever moves away from the valve 30 the flow of air to the machine will be shut off and connected to the exhaust in the manner described, in connection with the simplest form of the invention.

In many cases it is desirable to compel the operator to stay at the control point until the machine is functioning normally, has attained speed, or gotten through other kinds of actual stages so common in passing from rest to full operating position. In that event the parts shown in Figures 1 and 2, not already described, are added to the valve control with locking means just described.

To accomplish this, the diaphragm-actuated plunger, 39, the elements pivoted on studs 35 and 74, and accessory thereto, are added. This controlled equipment may be a press whose ram 2 reacts against a head 3, but it could be any other device.

The operation is precisely the same but the operator must pause, one hand closing the valve, the other delaying the latching until the controlled equipment has had time to strike its normal pace.

Another passage, 31, is added to valve body 28.

When the manual 8 is now depressed the spring finger 17 pushes the valve button 18 in a manner previously indicated, opening the flow of air past valve disk 25, shutting off the flow through the exhaust 20, and permitting the flow of air into line 22 as well as the loss of air through the outlet 42 unless the valve disk 32 which is adapted to shut off passage 31 is kept seated. Valve disk 32 is carried by valve stem 34 which projects out of the valve casing.

Means are provided to hold this valve seated as long as the operator's right hand holds the latch withdrawn. Since this latch must be withdrawn by the right hand before the left can open the valve, it is clear that valve 32 always is seated before air is admitted to passage 31 and there is no initial air loss. This mechanism whereby the locking rocker 55, holds the valve disk 32 seated when finger 82 is depressed will now be described.

A stud 74 attached to casting 50 carries an arm 78, the end of which, 79, will be contacted by the back of arm 69 when the rocker 55 turns clockwise under the impulsion of the manual 82. The other end of arm 78 carries an arm 73. Through a hole in the end of arm 73 passes a rod 38 carrying two spaced pins 72. The other end of rod 38 is attached to swinging arm 36. This arm is carried by a stud 35 attached to casting 50. The end of the arm 37, is adapted to contact valve button 34 and hold valve disk 32 seated. When the operator depresses manual 82, turning the rocker 55 clockwise, the arm 69 permits lever 56 to open the valve and the back of the arm 69 also engages projecting end 79 of the lever 78, positively forcing that end of the lever over to the right (Figure 1) and thus, in the manner just described, positively closes the valve 32 so long as the manual 82 is held down.

To permit the release of manual 82 when the controlled apparatus is running smoothly so that hooked arm 69 may engage lever 56 and hold the valve actuated without unseating valve disk 32, diaphragm unit 61 is provided.

This unit consists of casting 60 and casting 64 bolted together and holding between them a flexible diaphragm 63. A branch line 70 branches off from the air outlet of the valve 22, passing through a control valve such as a needle valve 71 into the chamber 65. The air passing through this branch presses upon the diaphragm 63. On the other side of the diaphragm is a plunger 39 forced against the diaphragm by spring 62. A substantial pressure must be built up in the space 65 before the diaphragm is able to overcome the force of spring 62, thus assuring an easy, gradual movement for the plunger 39 which then presses against the end of the arm 37. Only when enough air has had time to flow through the by-pass 70 into the space 65 will the plunger 39 supplant the rod 38 as the means of holding valve button 34 shut. When this has been accomplished the manual 82 may be released and as it snaps back into the position shown on the drawings the hooked lever 69 will pass over the top of lever 56 holding that too in its actuated position.

Reviewing the operation of the complete unit shown in Figures 1 and 2, the unit is controlled solely by one manual 8.

This manual is normally locked in place. To release it, the other manual 82 must first be depressed. While it is held depressed, the passage 31 is held closed, and the manual 8 has complete control of the machine, being able to start, stop, or reverse the machine. The reversal is accomplished by connecting the equipment controlled to exhaust.

If manual 82 is released before manual 8, the valve will be locked in a position to allow air to flow through valve 30. This may be done at any time after the valve 30 has been opened manually. However, if the operation is performed too fast, the diaphragm unit 61 will not have had a chance to function before the release of manual 82 has allowed valve disk 32 to leave its seat, and though the valve is locked in the open position, the fluid flow is deviated to the atmosphere or sump, requiring the operator to shut off the valve manually and start over.

After the valve has been opened and locked into place and the operator has let go of the manuals, it may be closed in two ways.

By depressing manual 82 rocker 55 will be swung about stud 53 against the force of the spring 52. This will allow the spring 11 to swing the lever 56 about its stud 43 returning to the position shown where the air is cut off and the air behind diaphragm 63 is free to escape through exhaust 20.

The valve may also be closed automatically by failure of the pressure in line 26. If the valve is in its actuated position and air in chamber 65 is pressing upon the diaphragm 63 then, as soon as the pressure in line 26 drops air will flow backwards from space 65 to line 26. This will remove the pressure of plunger 39 from the end of valve button 34 permitting the valve to open and air in the line 22 to escape at 42. Thus, even though the rocker 55 has locked the lever down, and still holds it down, and therefore the valve disk 25 is wide open when air comes back on the line 26, the machine will not be started up automatically but the air will escape at 42, thus preventing "repeating."

To start the machine manual 82 must be operated. This closes the valve 32, but it also releases the latch that held lever 56 in a position where the spring finger 17 opens valve 30. So the operator must push down manual 8 too. That is, the valve must be operated in the same manner as from a fresh start.

What I claim is:

1. A valve control comprising, in combination, a valve assembly having a projecting stem that moves a valve disc against its seat, a manually actuated lever drawn by a spring away from the projecting stem and having a pre-loaded spring contact which may, under manual impulsion, push the stem in far enough to seat the valve disc before compressing and then upon overtravel of the manual lever compress, a locking member for the lever that must be withdrawn to permit moving the lever and which, if released, will lock the lever either in its inactive or in its active position, the lever upon release of the hand receding a portion of the overtravel during which time the expanding preloaded spring holds the valve discs fully seated.

2. A control for fluid, comprising in combination, a valve body in a conduit, a valve in the body that can be held open manually, a by-pass in the valve body, a valve in said by-pass biased to open position, manual means to hold the by-pass valve closed, a timer set in operation by the opening of the first-mentioned valve and the closing of the by-pass valve, means set in operation by the timer to hold the by-pass valve closed after a delay, permitting the release of the manual means to close the by-pass valve.

3. A control for a fluid operated device comprising an intake valve for admitting fluid to the device, an exhaust valve for releasing fluid therefrom, means for connecting said valves together whereby the one may be open and the other closed by a common movement, a pressure relieving means connected to relieve the pressure beyond said intake valve, manual means for holding the pressure releasing means in non-pressure releasing position, timing mechanism connected to be started to function by the operation of said valves and manual means and means operated by said timing mechanism after a predetermined interval of operation thereof for holding said pressure releasing means in non-releasing position.

4. A two hand controlling mechanism for a fluid operated device comprising a valve body having a chamber connected to the apparatus controlled, an inlet and an exhaust valve, additional pressure releasing means, two biased manually operated controls, said valves being so connected to said controls that on the operation of both of said controls said fluid operated device will be connected to a source of pressure and disconnected from an exhaust and said additional pressure releasing means will be held closed, whereby the device may be operated only by the simultaneous operation of both controls, a timing mechanism connected to be started in operation by the operation of said controls and means operated by said timing mechanism after a predetermined interval for holding said additional pressure releasing mechanism closed after the one biased control is released.

5. A device in accordance with claim 4 having means for locking said valves in the operated position, whereby upon operation and release of said controls before the predetermined operation of said timing mechanism, said valves remain in closed position but inoperative to admit pressure to the fluid operated devices because of the release of pressure by said pressure releasing means.

6. A manually controlled valve having, in combination, a valve body containing a valve biased to close, a safety vent and a supply line to a delay device adapted to close the vent, both located beyond the valve, manual means to open the valve, other manual means adapted either to close the vent or to lock the valve open so that the said other means must remain engaged after opening the valve until the delay device holds the vent closed, after which the said other manual means may be used to lock the valve open.

7. A manually controlled valve in a conduit supplying fluid to a system which may be locked open only after pressure has built up in the system comprising, in combination, a valve body, a valve in the body biased to close, a safety outlet beyond the valve that must be held closed to build up pressure in the system, manual means for holding the valve open, dual means for holding the safety outlet closed, one means operated by the pressure in the system, the other manually operated, means including a single manual control element which in one position manually closes the safety outlet, and in its other position locks the manual means which holds the valve open, the parts coacting so that if the valve is locked open before the pressure operated device has taken over the function of holding the safety outlet closed the locking open of the main valve will be of no avail in building up pressure in the system.

8. A valve control for a fluid system having, in combination, a valve body having a valve seat and a normally open pressure release port and a contracted branch line beyond the valve seat, a manually operated valve on the seat means to lock the valve in open or closed position, a preloaded assembly including a plunger biased against closing the pressure release port, a fluid operated device supplied through the branch line adapted to overcome the bias of the pre-loaded assembly, supplementary means closing the pressure release port only while the valve locking mechanism is disengaged.

9. A control for supplying fluid to a system which includes a manually operable valve biased to close and means for locking the valve open that compel reactuation of the manual valve to again lock the valve open after failure of the fluid pressure, having in combination, a valve body which includes a manually operable inlet valve biased to close for the admission of fluid to the system and a pressure failure vent, means for automatically holding the vent closed while the system is under pressure, safety means that must be manually actuated after each pressure failure to permit operation of the manual valve and to hold the vent closed until the pressure has again built up in the system.

HARRY E. KOEPCKE.